3,285,810
METHOD FOR PREVENTING TERMITE INFESTATION IN STRUCTURES
Virginia L. Hart, Box 291, Clearlake Highlands, Calif.
No Drawing. Filed Nov. 4, 1964, Ser. No. 408,742
5 Claims. (Cl. 167—24)

The present invention relates to a method for preventing termite infestation in structures, and more particularly to such a method wherein redwood bark wool is the agent by which such infestation is prevented.

One of the most prominent causes of wooden structure deterioration is the infestation of such structures by termites. Any wooden structures having wooden footing on or in close vicinity to the ground are always in danger of attack by termites if the soil conditions are conducive to the nesting of termites therein. Termites being a hardy insect, manage to find suitable nesting places over vast areas of the country and termite damage is experienced almost universally. As is well known, termites depend upon dead wood for their food, and the wooden structural members of homes and other similar buildings presents a very attractive source of food for the termites. Unless careful and continued surveillance is maintained, damage to the structure can become quite expensive, and the loss runs to many hundreds of thousands of dollars per year in the United States alone.

The principal means presently practiced for preventing termite infestation of wooden structures depends upon the use of various chemical poisons that are toxic to the insects. By means such as soaking, brushing, and/or spraying, these chemical substances are applied to the wooden members that are in contact with or adjacent to the ground where termites might lurk. Such methods are quite effective so long as a proper concentration of poisonous chemicals are maintained on the wooden members.

However, such chemicals tend to lose their potency with time and therefore continued and repeated applications are necessary. In addition, once the wooden members have been erected into a structure it is sometimes very difficult to get into all corners and crevices when new applications of the chemicals are required. Further the repeated application of the poisonous chemicals becomes quite expensive and many owners neglect to repeat the treatment whereby the original chemical applications wear off and the structural members once again are susceptible to termite damage. And, of course, such chemicals are toxic to humans as well as to the insects, thus presenting a health hazard.

In the present invention a method has been discovered whereby terminate infestation of wooden structures is prevented through the use of a completely harmless permanent material wherein a single applicaiton will prevent termite infestation throughout the entire life of the structure. The material utilized in such method is redwood bark wool. This redwood bark wool is a material that has been in use rather extensively for many years, but for the purpose of providing insulation for structures. However, utilizing the method of the invention, it has been found that such material will effectively prevent termite infestation of wooden structures.

It is, therefore, an object of the invention to provide a method for preventing the termite infestation of structures.

It is another object of the invention to prevent the termite infestation of structures through the use of redwood bark wool.

It is yet another object of the present invention to prevent the termite infestation of structures on a permanent basis through but a single application of a harmless, permanently effective material.

Other objects and advantages of the invention will become apparent from the specification and claims following.

The method of the present invention comprises placing a layer or blanket of redwood bark wool directly on the soil surface underlying a wooden structure. Generally such structures have the wooden structural members of the building placed upon a concrete footing or foundation, which separates the wooden members from direct contact with the earth. Some structures are found wherein the wooden members are in direct contact with the earth, and in such instance the practice of the method of the invention is also effective. In any event, in most such structures a "crawl space" is provided between the soil and the undermost portion of the structure. This "crawl space" having the soil as a floor and the floor joists and sub-flooring of the structure as a ceiling, is bounded about its perimeter by the concrete foundation walls.

In the practice invention method, a layer of redwood bark wool is placed upon the entire exposed earth surface forming the floor of the "crawl space." To be most effective in preventing the entry of termites into the wooden members, such layer or mat of redwood bark wool should be laid over the earth to a depth of approximately 3 inches, although a layer of less than this extent is also effective.

The redwood bark wool which comes in bales of a relatively loose mass can be distributed over the earth surface within the crawl space either by hand or by other means such as blowing. Since redwood bark wool is extensively utilized for the purposes of insulation in structures, its application over large areas is well developed and is well known to those in the art. In any event this layer or mat of redwood bark wool is distributed so as to cover all exposed earth surfaces in the spaces underneath the wooden structure.

Although it is preferable to make absolutely certain that all exposed earth surfaces are covered by the redwood bark wool mat, such complete coverage is not absolutely necessary, since it has been found that termites abhor even coming within the near vicinity of redwood bark wool, whereby they will not pass through small exposed areas of earth so long as the redwood bark wool mat is close by.

The redwood bark wool mat may be applied to the earth surface in the crawl space at the time the structure is built, or may be applied to the earth surface at any time thereafter. Thus, even structures that have been in existence for many years, can be effectively protected from termite damage by applying such a layer of wool thereunder.

It has been found that termites absolutely refuse to pass through or close to redwood bark wool. The reason that this is so is not completely understood, however, it has been observed that redwood bark wool retains this termite repellent property throughout its entire life.

In fact it has been found that termites abhor the presence of redwood bark wool to such an extent that if a mat of redwood bark wool is placed over the earth underlying a structure previously infested with termites, the termites will soon leave the structure and it will become entirely free of infestation. Thus the method of the present invention may be practiced to free a structure already infested with termites and thereafter keep such structure free from further infestation. To accomplish such results it is only necessary that the redwood bark wool be applied to all exposed earth surfaces underlying the structure as previously described. It has been found that within several weeks after such application any termite which had previously infested the structure will leave and never return.

Redwood bark wool is a refined product from the bark of the redwood tree indigenous to the Pacific Coast. These trees, the *Sequoia sempervirens,* are protected with a thick bark that is characteristically dark reddish brown, fibrous and deeply furrowed. When the trees are processed for lumber this bark is removed and processed to produce a thermal insulating material comprising the bark fibers.

In the process of producing redwood bark wool, the fibers are separated from the smaller cork cell wall fragments and other amorphous material. The separated bark fibers may be from approximately one to two inches in length and are characterized by a corkscrew structure and a high strength and resistance to deterioration. The process for producing the redwood bark wool, its use, chemical composition and other pertinent data is discussed in an article appearing in the publication of the American Society of Refrigerating Engineers, known as "Refrigerator Engineering," issue of August 1951. The referenced article entitled, "Redwood Bark Fiber Insulation—Its Properties and Application," by Edward Simons, presents a complete description of the method for preparing redwood bark wool, its physical and chemical properties.

Redwood bark wool is readily available commercially in a form that is perfectly suitable for use in the invention without further processing. The redwood bark wool is especially common in the western portion of the United States and is available through most lumber and building supply retailers and wholesalers.

The redwood bark wool when applied to the exposed earth surfaces beneath a wooden structure furnishes protection from termite invasion for an indefinite period of time. The wool is very stable, and even though it is in direct contact with the soil and is subject, therefore, to extreme conditions of moisture and weathering, its useful life will continue so long as the layer is not physically removed from the soil surface.

What is claimed is:

1. A method for preventing termite infestation in structures having exposed earth surfaces therebeneath comprising placing a layer of redwood bark wool over said exposed earth surfaces whereby termites are repelled from said structures.

2. The method of claim 1 wherein said redwood bark layer is laid to a depth of about 3 inches.

3. A method of ridding a structure from termite infestation comprising laying a blanket of redwood bark wool over any exposed earth surfaces underneath said structure, whereby any termites infesting the structure leave and do not return.

4. A method for preventing termite infestation in a structure having exposed earth surfaces therebeneath comprising blowing redwood bark wool underneath said structure to form a layer of said wool over essentially the entire area of said exposed earth surfaces.

5. The method of claim 4 wherein said redwood bark wool is derived from the bark of the tree species *Sequoia sempervirens.*

References Cited by the Examiner

UNITED STATES PATENTS

| | | | |
|---|---|---|---|
| 69,376 | 10/1867 | Walton | 119—1 X |
| 2,139,225 | 12/1938 | Easling | 52—101 |
| 2,899,771 | 8/1959 | Burris | 43—124 X |
| 2,952,938 | 9/1960 | Abrams | 43—131 |

OTHER REFERENCES

Farmers Bulletin No. 1911, "Subterranean Termites," U.S. Dept of Agriculture, 1949 S–21–A6, page 15.

Farmers Bulletin No. 1993, "Decay and Termite Damage in Houses," S–21–A6, page 15.

ALDRICH F. MEDBERY, *Primary Examiner.*